United States Patent
Schissel et al.

(10) Patent No.: US 6,849,333 B2
(45) Date of Patent: Feb. 1, 2005

(54) OPTICAL FIBER WITH AN IMPROVED PRIMARY COATING COMPOSITION

(75) Inventors: David N Schissel, Painted Post, NY (US); Michael J Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 95 days.

(21) Appl. No.: 10/056,940

(22) Filed: Jan. 25, 2002

(65) Prior Publication Data

US 2003/0049446 A1 Mar. 13, 2003

Related U.S. Application Data

(60) Provisional application No. 60/292,127, filed on May 18, 2001.

(51) Int. Cl.$^7$ .............................. B32B 9/00; G02B 6/22; C08F 2/46; B05D 5/06
(52) U.S. Cl. ........................ 428/392; 428/375; 385/123; 385/128; 385/145; 522/90; 522/96; 522/97; 522/98; 427/162; 427/163.2
(58) Field of Search ................................. 385/123, 126, 385/128, 145; 427/163.2, 162; 428/375, 392; 522/96, 90, 98, 97

(56) References Cited

U.S. PATENT DOCUMENTS

| | | | |
|---|---|---|---|
| 4,496,686 A | 1/1985 | Ansel | 524/850 |
| 4,609,718 A | 9/1986 | Bishop et al. | |
| 4,624,994 A | 11/1986 | Ansel | 525/440 |
| 4,682,851 A | 7/1987 | Ansel | 350/96.34 |
| 4,751,273 A | 6/1988 | Lapin et al. | 525/455 |
| 4,973,611 A | 11/1990 | Puder | 522/42 |
| 4,996,282 A | 2/1991 | Noren et al. | 528/75 |
| 5,578,693 A | 11/1996 | Hagstrom et al. | 528/75 |
| 6,057,034 A | 5/2000 | Yamazaki et al. | 428/378 |
| 6,287,745 B1 | 9/2001 | Yamamura et al. | 430/269 |
| 2003/0049446 A1 * | 3/2003 | Schissel et al. | 428/375 |

FOREIGN PATENT DOCUMENTS

| | | | |
|---|---|---|---|
| EP | 0228854 | 12/1986 | |
| EP | 874012 A1 * | 10/1998 | C08G/18/65 |
| JP | 5-271618 | 10/1993 | C09D/175/16 |
| WO | WO 00/18696 | 9/1999 | |
| WO | WO 00 12579 | 3/2000 | C08G/18/62 |
| WO | WO 01/05724 A2 | 1/2001 | |

OTHER PUBLICATIONS

Nagarajan et al, "Synthesis and Characterization of Radiation Curable Polyurethane Containing Pendant Acrylate Groups", Nov. 1986, Polymer Eng. and Science, vol. 26, pp. 1442–1450.

Rosen, Stephen L, "Fundamental Principles of Polymeric Materials", 1982, A Wiley–Interscience Publication, pp. 53–81.

* cited by examiner

*Primary Examiner*—Rena Dye
*Assistant Examiner*—Jill M. Gray
(74) *Attorney, Agent, or Firm*—Timothy R. Krogh; Robert L. Carlson

(57) ABSTRACT

The present invention is directed to a radiation curable primary coating composition and an optical fiber with said coating. The primary coating preferably results in excellent mechanical and physical properties, and when coated on optical fibers in a reduction in micro-bending transmission losses over optical fibers with conventional coatings. In one embodiment of this invention, it relates to a coated optical fiber comprising an optical fiber and a radiation cured primary coating wherein the radiation cured primary coating on the optical fiber comprises an oligomer and wherein the oligomer is formed from a reaction comprising a polyol having "m" hydroxyl functional groups, wherein "n" hydroxyl groups of said polyol are terminated in forming the oligomer and "m" is greater than "n".

53 Claims, 2 Drawing Sheets

OPTICAL FIBER WITH AN IMPROVED PRIMARY COATING COMPOSITION

CROSS-REFERENCE TO RELATED APPLICATIONS

This application claims the benefit of U.S. Provisional Application, Ser. No. 60/292,127, filed May 18, 2001 entitled OPTICAL FIBER WITH AN IMPROVED PRIMARY COATING COMPOSITION, by David N. Schissel and Michael J. Winningham.

BACKGROUND OF THE INVENTION

1. Field of the Invention

This invention relates to a radiation curable composition which is useful as a protective coating for optical fibers, i.e., a primary coating. This invention further relates to the use of an oligomer containing free hydroxyl functionality to prepare such radiation curable primary optical fiber coatings possessing excellent mechanical properties and a very low glass transition temperature. This invention further relates to a coating for an optical fiber which has satisfactory mechanical properties including low modulus, and high elongation. This invention further relates to a fiber with this primary coating preferably with excellent micro-bend resistance when compared to conventionally coated fibers.

2. Technology Review

Optical fibers have acquired an increasingly important role in the field of communications, frequently replacing existing copper wires. This trend has significantly impacted local area networks (i.e., fiber-to-home uses), which has seen a vast increase in the usage of optical fibers. Further increases in the use of optical fibers in local loop telephone and cable TV service are expected, as local fiber networks are established to deliver even greater volumes of information in the form of data, audio and video signals to residential and commercial users.

This form of transmission is done by sending a beam of light through an optically clear fiber. Because interference with the light beam or its partial loss during the transmission must be at a minimum to make the use of optical fibers a successful communications technology, the optical fibers must be protected from any environment which will cause loss of signal or distortion of the signal. Coating the fibers is one such technique. The optical fibers are coated to protect the fiber surface from damage which can result from abrasion or water, to maintain the fiber strength, and to prevent transmission loss resulting from micro-bending. The term micro-bending refers to random bends in the coated glass fiber. These random bends generally have a short period (<1 mm) and a small amplitude (typically a few microns). Micro-bending may result from mechanical manipulation, e.g., lateral stresses arising when the fiber is wound on a drum or cable, or changes in temperature, e.g., thermal expansion or contraction differences between the glass fiber and the coating over a wide application temperature range. Coating materials which will provide cured films on the optical fiber that has all of these properties is difficult to achieve because improving one property often results in the decrease in another property.

Optical fibers typically contain a glass core, a glass cladding, and at least two coatings, i.e., a primary (or inner) coating and a secondary (or outer) coating. The primary coating which is applied immediately after the fiber is formed serves as a buffer to cushion and protect the glass fiber core when the fiber is bent, cabled, or spooled. In order for the loss in transmission to be as low as possible, the primary coating should maintain its flexible properties over a broad temperature range. Especially important is the low temperature flexibility. The low temperature flexibility can be obtained if the coating has a low glass transition temperature, $T_g$. The secondary coating is applied over the primary coating and functions as a tough, protective outer layer that prevents damage to the glass fiber during processing and use.

SUMMARY OF THE INVENTION

The present invention is directed to a radiation curable primary coating composition and an optical fiber with said coating. The primary coating preferably results in excellent mechanical and physical properties and when coated on optical fibers in an unexpected reduction in micro-bending transmission losses over optical fibers with conventional coatings.

In one embodiment, the present invention includes a coated optical fiber comprising an optical fiber and a radiation cured coating wherein the radiation cured primary coating on the optical fiber comprises an oligomer and wherein the oligomer is formed from a reaction comprising a polyol having "m" hydroxyl functional groups, wherein "n" hydroxyl groups of said polyol are terminated in forming the oligomer and "m" is greater than "n".

In another embodiment, the present invention includes a coated optical fiber comprising an optical fiber and a radiation cured primary coating wherein the radiation cured primary coating has a $T_g$ of less than about −30° C., a Young's modulus of less than about 1.0 Mpa, a tensile strength of at least 50% of the Young's modulus and an elongation to break of at least about 100%.

In another embodiment, the present invention includes a coated optical fiber comprising an optical fiber, a radiation cured primary coating and a radiation cured secondary coating wherein the radiation cured primary coating is the cured product of a bulk composition comprising an ethylenically unsaturated urethane oligomer, preferably an acrylate, and an ethylenically unsaturated monomer; wherein the oligomer is formed from a reaction comprising a polyol having "m" hydroxyl functional groups, wherein "n" hydroxyl groups of said polyol are terminated in forming the oligomer and "m" is greater than "n", and has a number average molecular weight of at least 4000 Daltons; wherein the ethylenically unsaturated monomer has an number average molecular weight of less than about 1000 Daltons; wherein the radiation cured primary coating has a Young's modulus of less than about 1.0 MPa, and a $T_g$ of less than about −30° C.; and wherein the cured radiation curable secondary coating has a Young's modulus of greater than about 600 MPa.

In another embodiment, the present invention includes a coated optical fiber comprising an optical fiber, a radiation cured primary coating and a radiation cured secondary coating wherein the coated optical fiber has a micro-bend attenuation as measured by the Lateral Load Wire Mesh Test (herein known as "LLWM" test and defined in the examples) of less than about 0.3 dB/m at a wavelength of 1310 nm, of less than about 0.35 dB/m at a wavelength of 1550 nm, and of less than about 0.55 dB/m at a wavelength of 1625 nm.

In another embodiment, the present invention includes a coating for an optical fiber comprising a radiation curable primary coating wherein the radiation curable primary coating on the optical fiber comprises an oligomer and wherein the oligomer is formed from a reaction comprising a polyol having "m" hydroxyl functional groups, wherein "n" hydroxyl groups of said polyol are terminated in forming the oligomer and "m" is greater than "n".

In another embodiment, the present invention includes a method of coating an optical fiber comprising the steps of drawing an optical fiber comprising a core and a cladding; coating the optical fiber with a radiation curable coating; and irradiating the optical fiber at a dose level to substantially cure the coating, preferably from about 0.5 J/cm$^2$ to about 1.0 J/cm$^2$; wherein the coated optical fiber has a micro-bend attenuation as measured by the LLWM test of less than about 0.3 dB/m at a wavelength of 1310 nm, of less than about 0.35 dB/m at a wavelength of 1550 nm, and of less than about 0.55 dB/m at a wavelength of 1625 nm.

In another embodiment, the present invention includes a method of making an optical fiber coating comprising the steps of reacting a compound containing at least one isocyanate group with an ethylenically unsaturated compound having OH, SH or NH$_2$ groups to form an intermediate; reacting the intermediate with a polyol having "m" hydroxyl groups wherein "n" hydroxyl groups of the polyol are terminated to form an oligomer with "m"-"n" free hydroxyl groups, wherein "m"-"n">0; and blending the oligomer with a monomer and a photoinitiator.

In another embodiment, the present invention includes a method of making an oligomer for an optical fiber coating comprising the steps of reacting a compound having at least one isocyanate group with an ethylenically unsaturated compound having OH, SH or NH$_2$ groups to form an intermediate; and reacting the intermediate with a polyol having "m" hydroxyl groups wherein "n" hydroxyl groups of the polyol are terminated to form an oligomer with "m"-"n" free hydroxyl groups wherein "m" is greater than "n".

Additional features and advantages of the invention will be set forth in the detailed description which follows, and in part will be readily apparent to those skilled in the art from that description or recognized by practicing the invention as described herein, including the detailed description which follows and the claims. It is to be understood that both the foregoing general description and the following detailed description are merely exemplary of the invention, and are intended to provide an overview or framework for understanding the nature and character of the invention as claimed.

DETAILED DESCRIPTION OF INVENTION

The present invention relates to a curable coating composition, preferably a primary coating composition, for coating optical fibers which when cured on the optical fiber by radiation curing techniques results in a coating with mechanical and physical properties which result in an unexpected reduction in micro-bending transmission losses.

Figure 1:
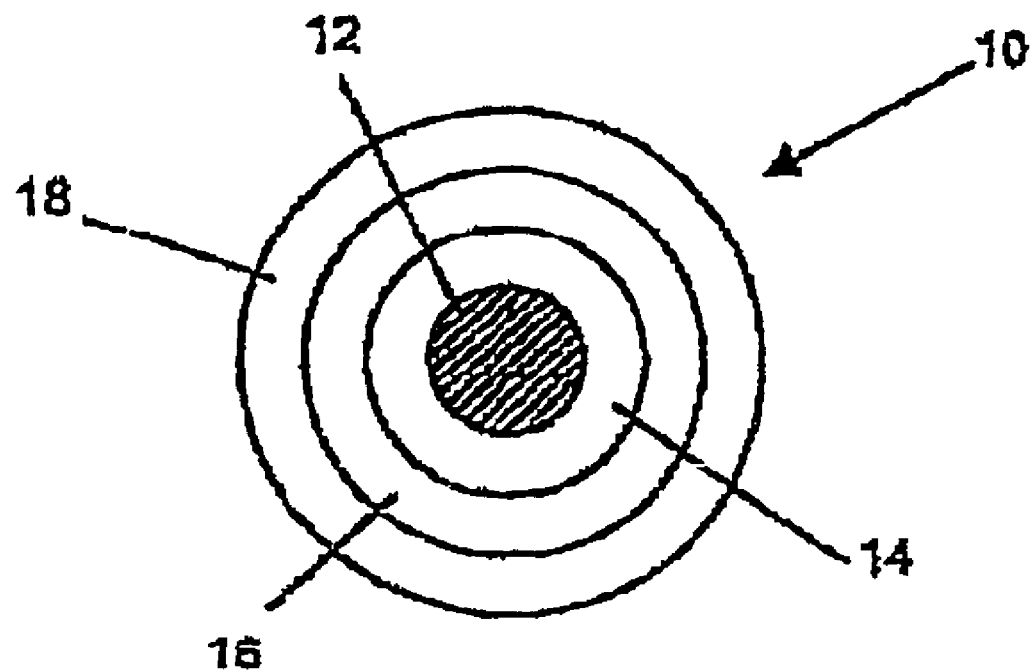
FIG. 1 shows a cross-sectional view of an optical fiber with a primary and an optional secondary coating.

The uncoated optical fibers used for the present invention are known in the industry, and can be produced by any method known to those skilled in the art. Preferably, as shown in FIG. 1 the optical fiber 10 consists of a 12 and a cladding layer 14. The core 12 and the cladding layer 14 are typically produced in a single operation or a multi-step operation by methods that are known in the art. Suitable methods include: the double crucible method as described for example in Midwinter, Optical Fibers for Transmission, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes such as Outside Vapor Deposition ("OVD") and Vapor Axial Deposition ("VAD") (Blankenship et al., "The Outside Vapor Deposition Method of Fabricating Optical Waveguide Fibers," *IEEE J. Quantum Electron.*, 18:1424–1431 (1982), which is hereby incorporated by reference), and modified CVD or inside vapor deposition such as Modified Chemical Vapor Deposition ("MCVD") and Plasma Chemical Vapor Deposition ("PCVD") see Nagel et al., "An Overview of the Modified Chemical Vapor Deposition (MCVD) Process and Performance," *IEEE J. Quantum Electron.*, 18:459–476 (1982), which is hereby incorporated by reference).

Any conventional material can be used to form the glass core 12, such as those described in U.S. Pat. No. 4,486,212 to Berkey, which is hereby incorporated by reference. The core is typically a silica glass having a cylindrical cross section and a diameter ranging from about 5 $\mu$m to about 10 $\mu$m for single-mode fibers and from about 20 $\mu$m to about 100 $\mu$m for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

Preferably, the optical fibers of the present invention are drawn from a specially prepared, cylindrical preform which has been locally and symmetrically heated to a temperature sufficient to soften the glass, e.g., of about 1800° C. or more for a silica glass. As the preform is heated, such as by feeding the preform into and through a furnace, a glass fiber is drawn from the softened material.

Preferably, the optical fibers of the present invention are large effective area fibers. By large effective area, we mean that the effective area of the fiber at 1550 nm is greater than about 60 $\mu$m$^2$, more preferably greater than about 70 $\mu$m$^2$, even more preferably greater than about 80 $\mu$m$^2$ and most preferably greater than about 90 $\mu$m$^2$. The effective area is $A_{eff}=2\pi(\int E^2 r\, dr)^2/(\int E^4 r\, dr)$, where the integration limits are 0 to $\infty$, and E is the electric field associated with light propagated in the waveguide. An effective diameter, $D_{eff}$, may be defined as, $A_{eff}=\pi(D_{eff}/2)^2$.

The primary and secondary coating compositions are applied to the glass fiber after it has been drawn from the preform, preferably immediately after cooling. The primary 16 and secondary 18 coatings can be applied by any method known to those skilled in the art. However, preferably, the coatings are applied as follows. The glass fiber, having a diameter of preferably between about 100 $\mu$m to about 225 $\mu$m, and more preferably of about 125 $\mu$m, is introduced into a chamber containing the primary coating composition for applying the primary coating composition to the fiber. As the coated fiber is removed from the chamber, the thickness of the primary coating composition on the optical fiber is adjusted so that the optical fiber with the cured primary coating 16 will preferably have a diameter from about 145 µm to about 290 µm, and more preferably about 190 µm. The method of curing the compositions of primary and secondary coatings of the present invention can be thermal, chemical or radiation induced depending upon the nature of the coating composition(s) and the optional polymerization initiator being employed. Radiation for purposes of this application means the application of infrared, visible light, atomic radiation, actinic radiation and ultraviolet rays, as well as ionized rays such as X-rays, electron beam, alpha-rays, beta-rays, gamma-rays and the like. "Cure", "curable", and "cured" for purposes of this application includes partially, substantially or totally cured coatings and compositions for coatings which can be partially, substantially or totally cured.

The primary coating composition is preferably cured with radiation, and more preferably ultraviolet radiation (although it is understood that both the primary and secondary coatings can be cured at once after application of both of the coatings). If ultraviolet radiation is used, preferably the coating is cured at a dose level of at least about $0.2\ \mathrm{J/cm^2}$, more preferably from about 0.5 to about $1.0\ \mathrm{J/cm^2}$.

The secondary coating can optionally also be applied by drawing the coated fiber through a second coating chamber containing the secondary coating composition. As the coated fiber is removed from the chamber, the thickness of the secondary coating composition on the optical fiber is adjusted so that the optical fiber with the cured secondary coating 18 will preferably have a diameter from about 200 µm to about 345 µm, and more preferably about 245 µm. The secondary coating thickness can also be adjusted by passing the coated fiber through a die. The secondary coating composition is then cured with radiation, and more preferably ultraviolet radiation. If ultraviolet radiation is used, preferably the coating is cured at a dose level of at least about $0.2\ \mathrm{J/cm^2}$, more preferably from about 0.5 to about $1.0\ \mathrm{J/cm^2}$.

Figure 2:
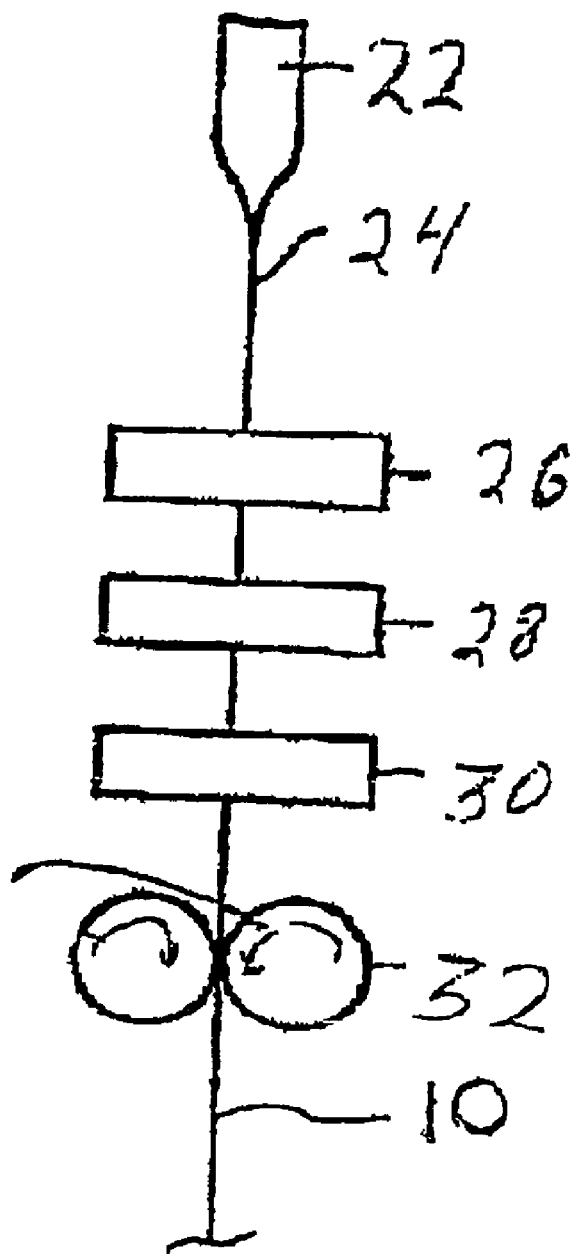
FIG. 2 is a schematic representation of an optical fiber drawing and coating apparatus.

FIG. 2 is a schematic representation of one of the preferred processes for drawing and coating an optical fiber. The partially sintered preform 22 is softened and drawn into a fiber 24. The uncoated fiber is then drawn through two coating dies 26 and 28 where the primary and secondary coatings, respectively, are applied to the fiber. The wet coated fiber is then cured by a bank of UV lamps 30. The fiber 10 is drawn from the preform and through the coating dies by a pair of tractors 32.

Preferably, the coated optical fiber with the primary coating composition of the present invention has a low micro-bend attenuation. Micro-bend attenuation can be measured by a number of tests known in the art. Two of these tests are the Expandable Drum Micro-bend test (herein abbreviated as "EDM test") and Lateral Load Wire Mesh Micro-bend test (herein abbreviated as "LLWM test"). The procedures for both the EDM and LLWM tests are defined in Example 8 herein.

Preferably, the coated optical fiber has a micro-bend attenuation as measured by the EDM test of less than about 0.35 (dB/km)/% strain at a wavelength of 1310 nm, more preferably of less than about 0.25 (dB/km)/% strain at a wavelength of 1310 nm and most preferably of less than about 0.151 (dB/km)/% strain at a wavelength of 1310 nm. Preferably, the coated optical fiber has a micro-bend attenuation as measured by the EDM test of less than about 1.1 (dB/km)/% strain at a wavelength of 1550 nm, more preferably of less than about 0.75 (dB/km)/% strain at a wavelength of 1550 nm and most preferably of less than about 0.44 (dB/km)/% strain at a wavelength of 1550 nm. Preferably, the coated optical fiber has a micro-bend attenuation as measured by the EDM test of less than about 2.0 (dB/km).% strain at a wavelength of 1625 nm, more preferably of less than about 1.4 (dB/km)/% strain at a wavelength of 1625 nm and most preferably of less than about 0.89 (dB/km)/% strain at a wavelength of 1625 nm.

Preferably, the coated optical fiber has a micro-bend attenuation as measured by the LLWM test of less than about 0.3 dB/km at a wavelength of 1310 nm, more preferably of less than about 0.15 dB/km at a wavelength of 1310 nm and most preferably of less than about 0.1 dB/km at a wavelength of 1310 nm. Preferably, the coated optical fiber has a micro-bend attenuation as measured by the LLWM test of less than about 0.35 dB/km at a wavelength of 1550 nm, more preferably of less than about 0.25 dB/km at a wavelength of 1550 nm and most preferably of less than about 0.15 dB/km at a wavelength of 1550 nm. Preferably, the coated optical fiber has a micro-bend attenuation as measured by the LLWM test of less than about 0.55 dB/km at a wavelength of 1625 nm, more preferably of less than about 0.4 dB/km at a wavelength of 1625 nm and most preferably of less than about 0.25 dB/km at a wavelength of 1625 nm.

If the coated optical fiber is a large effective area fiber, preferably, the coated optical fiber has a micro-bend attenuation as measured by the EDM test of less than about 0.151 (dB/km)/% strain at a wavelength of 1310 nm, of less than about 2.0 (dB/km)/% strain at a wavelength of 1550 nm, and of less than about 4.0 (dB/km)/% strain at a wavelength of 1625 nm.

If the coated optical fiber is a large effective area fiber, preferably, the coated optical fiber has a micro-bend attenuation as measured by the LLWM test of less than about 0.1 dB/km at a wavelength of 1310 nm, of less than about 0.3 dB/km at a wavelength of 1550 nm, and of less than about 1.0 dB/km at a wavelength of 1625 nm.

The primary and optional secondary coating compositions of the present invention are described and produced as follows. The primary coating composition comprises an oligomer wherein the oligomer is formed from a reaction comprising a polyol having "m" hydroxyl functional groups, wherein "n" hydroxyl groups of said polyol are terminated in forming the oligomer and "m" is greater than "n". Preferably, the primary coating composition also includes at least one monomer, and at least one photoinitiator. Additionally, the primary coating composition of the present invention can optionally include any number of additives, such as adhesion promoters, anti-oxidants, catalysts, lubricants, co-monomers, low-molecular weight non-crosslinking resins, and stabilizers. Some additives (e.g., chain transfer agents) can operate to control the polymerization process, thereby affecting the physical properties (e.g., modulus, glass transition temperature) of the polymerization product formed from the primary coating composition. Others additives can affect the integrity of the polymerization product of the primary coating composition (e.g., protect against de-polymerization or oxidative degradation).

Preferably, the cured primary coating has a $T_g$ of less than about $-30°$ C., more preferably has a $T_g$ of less than about $-35°$ C., and most preferably a $T_g$ of less than about $-40°$ C. The $T_g$ as described and claimed in the present invention is measured according to the procedure outlined in Example 4. Preferably, the cured primary coating has a Young's modulus of less than about 1.5 Mpa, more preferably has a Young's modulus of less than about 1.2 MPa, even more preferably has a Young's modulus of less than about 1.0 MPa and most preferably has a Young's modulus of about 0.85 MPa or less. Preferably, the cured primary coating has a tensile strength of at least 50% of the Young's modulus of the coating, more preferably has a tensile strength of at least 75% of the Young's modulus of the coating. Preferably, the cured primary coating has an elongation at break of at least about 100%, more preferably has an elongation at break of at least about 110% and most preferably has an elongation at break of at least about 125%. The Young's modulus, tensile strength and elongation at break as described and claimed in the present invention is measured according to the procedures set forth in ASTM Standard D882-97.

As used in this application, the weight percent of a particular component of the bulk primary or secondary coating composition refers to the amount of the oligomer, monomer and/or photoinitiator (excluding other additives) introduced into the coating composition. The amount of other additives that are introduced into the bulk primary or secondary composition to produce a composition of the present invention is listed in parts per hundred. The oligomer, monomer, and photoinitiator are combined to form the bulk composition such that the total weight percent of these components equals 100 percent. To this bulk composition, an amount of additive, for example 1.0 part per hundred of an anti-oxidant, is introduced in excess of the 100 weight percent of the bulk composition.

Preferably, the oligomer comprises from about 10 to about 90 weight percent, more preferably from about 35 to about 75 weight percent, and most preferably from about 40 to about 65 weight percent of the bulk primary coating composition. Preferably, the monomer comprises from about 10 to about 90 weight percent, more preferably from about 20 to about 60 weight percent, and most preferably from about 25 to about 50 weight percent of the bulk primary coating composition. Preferably, the photoinitiator comprises from about 0.1 to about 10 weight percent, more preferably from about 0.5 to about 5 weight percent, and most preferably from about 1.5 to about 3.5 weight percent of the bulk primary coating composition.

Primary Coating Composition

Oligomer

In one or more embodiments of the present invention, the oligomer is formed from a reaction comprising a polyol having "m" hydroxyl functional groups, wherein "n" hydroxyl groups of said polyol are terminated in forming the oligomer and "m" is greater than "n". Preferably, in this embodiment(s) the oligomer which is formed has at least one free hydroxyl group, and likewise it is important that the reactants which are used to form the oligomer are selected to give this result upon reaction. Preferably, this oligomer of the primary coating composition is an ethylenically unsaturated oligomer, more preferably the oligomer is an ethylenically unsaturated urethane oligomer, and most preferably the oligomer is a (meth)acrylate terminated urethane oligomer. By (meth)acrylate, it is meant to be an acrylate or a methacrylate. The (meth)acrylate terminal groups in such oligomers may be provided by a monohydric poly(meth)acrylate capping component, or by a monohydric mono(meth)acrylate capping component such as 2-hydroxyethyl acrylate.

It is preferred that the hydroxyl group does not substantially take part in the cure of the coating composition as a chain transfer agent, more preferably not at all. It is further preferred that the hydroxyl group does not substantially participate in the growth of the polymer network. Additionally it is preferred that the hydroxyl group does not substantially serves as crosslinker for growing the polymer network. Preferably, the polymer network is a result of the curing of the acrylate groups in the coating composition.

The oligomer for use in the primary coating of the present invention is preferably formed as follows. An ethylenically unsaturated intermediate with free isocyanate groups (NCO) is formed from the reaction of an isocyanate compound with an ethylenically unsaturated compound having OH, SH and $NH_2$ groups wherein the amounts and specific compounds are selected to ensure some free isocyanate groups (NCO). More preferably, an isocyanate compound is reacted with an ethylenically unsaturated compound having OH, SH and $NH_2$ groups wherein the amounts and specific compounds are selected to ensure about 2 equivalents of isocyanate groups (NCO) per every about one equivalent of OH, SH and $NH_2$ groups. The ethylenically unsaturated compounds include by way of example but not limitation (meth)acrylates including acrylates and methacrylates, acrylamides, N-vinyl amides, styrenes, vinyl ethers, vinyl esters, acid esters, and combinations thereof (i.e., for polyfunctional oligomers). More preferably, the ethylenically unsaturated compound is a (meth)acrylate. (Meth)acrylates include by way of example but not limitation hydroxyethyl acrylate (HEA), hydroxypropyl acrylate (HPA), pentaerythritol triacrylate (PETA), trimethylolpropane diacrylate (TMPDA), and polypropyleneglycol acrylate (PPGA) Most preferably, the acrylate is 2-hydroxyethyl acrylate. Preferably, di-, tri- and polyfunctional isocyanates are used to form the intermediate. More preferably, diisocyanates are used. Diisocyanate compounds include by way of example but not limitation toluene diisocyanate (TDI), tetramethylxylene diisocyanate (TMXDI), isophorone diisocyanate (IPDI) and methylene di-p-phenylene isocyanate (MDI). Most preferably, the isocyanate is 4,4'-methylenebis (cyclohexylisocyanate).

Additionally, in forming the intermediate, the oligomer, and the coating compositions, a number of additives can optionally be used alone or in combination. By way of example and not by way of limitation, these additives include anti-oxidants, catalysts, stabilizers, as well as other additives known to those skilled in the art. These additives are described in greater detail later in the application under the primary coating composition due to the fact that many of the additives may be similarly added to the primary and secondary coating compositions.

The oligomer is formed by reacting the ethylenically unsaturated intermediate with a polyol having "m" hydroxyl functional groups, wherein "n" hydroxyl groups of the polyol are terminated in the reaction of forming the oligomer. Therefore, the initial reactants used to form the ethylenically unsaturated intermediate with free isocyanate groups (NCO) and the polyol are chosen to ultimately result in an oligomer where preferably "m"–"n"≧ about 1, more preferably "m"≦ about 4, and most preferably "m"–"n" is ≧ about 1 and "m"≦ about 4. Preferably, the polyol used to form the oligomer of the present invention has about two or more hydroxyl functional groups per molecule, more preferably about three or more hydroxyl functional groups per molecule, even more preferably from about three to about four hydroxyl functional groups per molecule, even more preferably about three hydroxyl functional groups per molecule, and most preferably, the polyol used is a trifunctional poly(propylene oxide) based polyol (e.g. Acclaim 6320® with a hydroxyl number of about 27.6 mg/g, 3 hydroxyl groups per chain and a molecular weight of approximately 6000 Dalton, available from Bayer of Pittsburgh, Pa.). Preferably, the polyol has a number average molecular weight of at least about 2000 Dalton, more preferably of at least about 4000 Dalton, even more preferably of at least about 6000 Dalton, and most preferably of at least about 7000 Dalton. Preferably, the oligomer has a number average molecular weight of at least about 4000 Dalton, more preferably of at least about 6000 Dalton, and most preferably of at least about 8000 Dalton.

Optionally, the primary coating composition further comprises at least one more oligomer which is mixed with the coating composition. A second oligomer of the type described above may be used or any other oligomer known to those skilled in the art may be used to blend with the above oligomer to achieve the properties desired for the primary coating composition.

Optional additional oligomers that may be added to the coating composition may include polyether urethane acrylate oligomers (e.g., CN986 available from Sartomer Company, Inc., (West Chester, Pa.)) and BR3731 and STC3-149 available from Bomar Specialty Co. (Winstead, Conn.)), acrylate oligomers based on tris(hydroxyethyl)isocyanurate, (available from Sartomer Company, Inc.), (meth)acrylated acrylic oligomers, (available from Cognis (Ambler, Pa.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., the specifications of which are hereby incorporated by reference), epoxy acrylate oligomers (e.g., CN120 available from Sartomer Company, Inc., and Ebecryl 3201 and 3604 available from UCB Radcure), hydrogenated polybuladiene oligomers (e.g., Echo Resin MBNX available from Echo Resins and Laboratory (Versailles, Mo.)), and combinations thereof.

Monomer

Preferably, a monomer is used in the primary coating composition. The monomeric component can include a single monomer or it can be a combination of two or more monomers. Preferably, the monomeric component introduced into the composition of the present invention comprises ethylenically unsaturated monomer(s). More preferably, an ethylenically unsaturated monomers may contain more than one functional group to enable cross-linking. The ethylenically unsaturated monomer can be a mono-functional monomer, a poly-functional monomer and mixtures thereof. Even more preferably, the ethylenically unsaturated monomers are mono-functional monomers. Poly-functional (i.e., each containing two or more functional groups), can also be introduced into the composition, but preferably in small quantities relative to the mono-functional monomer for the primary coating composition. Suitable functional groups for ethylenically unsaturated monomers used in accordance with the present invention include by way of example without limitation, acrylates, methacrylates, acrylamides, N-vinyl amides, styrenes, vinyl ethers, vinyl esters, acid esters, and combinations thereof (i.e., for polyfunctional monomers).

It may also be desirable to use certain amounts of mono-functional ethylenically unsaturated monomers, which can be introduced to influence the degree to which the cured product absorbs water, adheres to other coating materials, or behaves under stress. Exemplary mono-functional ethylenically unsaturated monomers include, without limitation, hydroxyalkyl acrylates such as 2-hydroxyethyl-acrylate, 3-hydroxypropyl-acrylate, and 4-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecylacrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR506, Sartomer Company, Inc.), tetrahydrofurfuryl acrylate (e.g., SR285, Sartomer Company, Inc.), various alkoxylated alkylphenol acrylates such as ethoxylated(4) nonylphenol acrylate (e.g., Photomer 4003, Cognis Corp.), and acryloylmorpholine; alcohol-based acrylates such as polyethylene glycol monoacrylate, caprolactone acrylate (e.g., SR495, Sartomer Company, Inc.), polypropylene glycol monoacrylate, methoxyethylene glycol acrylate, methoxypolypropylene glycol acrylate, methoxypolyethylene glycol acrylate, and ethoxydiethylene glycol acrylate; acrylamides such as diacetone acrylamide, isobutoxymethyl acrylamide, N,N'-dimethylaminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Illustrative of poly-functional ethylenically unsaturated monomers are those monomers which have two, three, four, or more functional groups, which may participate in the cure. Suitable poly-functional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Cognis Corp. (Ambler, Pa.)), hexane diol diacrylate (e.g., SR238 available from Sartomer Company, Inc., West Chester, Pa. and Photomer 4017 available from Cognis Corporation, Ambler, Pa.) and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Cognis Corp., and SR499, Sartomer Company, Inc.), propoxylated trimethylolpropane triacrylate with propoxylation being 3 or greater, preferably ranging from 3 to 30 (e.g., Photomer 4072, Cognis Corp. and SR492, Sartomer Company, Inc.), and ditrimethylolpropane tetraacrylate (e.g., Photomer 4355, Cognis Corp.); alkoxylated glyceryl triacrylates such as propoxylated glyceryl triacrylate with propoxylation being 3 or greater (e.g., Photomer 4096, Cognis Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Cognis Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (e.g., Photomer 3016, Cognis Corp.); and single and multi-ring cyclic aromatic or non-aromatic polyacrylates such as dicyclopentadiene diacrylate and dicyclopentane diacrylate.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride. Preferably, the monomer or the mixture of monomers has a number average molecular weight of less than about 2000 Dalton, more preferably of less than about 1000 Dalton, and most preferably of less than about 600 Dalton.

Photoinitiator

Preferably, a photoinitiator is used in the primary coating composition. The photoinitiator should be suitable to cause polymerization (i.e., curing) of the composition after its application to a glass fiber. For most acrylate-based coating formulations, photoinitiators, such as the ketonic photoinitiating and/or phosphine oxide additives, are preferred. When used in the compositions of the present invention, the photoinitiator is present in an amount sufficient to provide rapid ultraviolet curing.

The photoinitiator, when used in a small but effective amount to promote radiation cure, may provide reasonable cure speed without causing premature gelation of the coating composition. A desirable cure speed is any speed sufficient to cause substantial curing of the coating materials. As measured in a dose versus modulus curve, a cure speed for coating thicknesses of about 25 to about 100 µm is preferably less than about 1.0 J/cm2, and more preferably less than about 0.5 J/cm2.

Suitable photoinitiators include by way of example but not limitation 1-hydroxycyclohexylphenyl ketone (e.g., Irgacure 184 available from Ciba Specialty Chemical (Hawthorne, N.Y.), bis(2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxyl-2-phenyl acetophenone (e.g., Irgacure 651, available from Ciba Specialty Chemical), bis(2,4,6-trimethyl benzoyl)phenyl-phosphine oxide (Irgacure 819), (2,4,6-trimethylbenzoyl)diphenyl phosphine oxide (Lucerin TPO, available from BASF (Munich, Germany)), ethoxy (2,4,6-trimethylbenzoyl) phenyl phosphine oxide (Lucerin TPO-L from BASF), and combinations thereof.

Preferably the polymerization of the composition comprises free radical polymerization and not cationic polymerization. Therefore optionally, the composition may be substantially devoid of a cationic polymerization initiator.

Other Additives

The primary coating composition may also optionally include an adhesion promoter. Preferably, the adhesion promoter is a silane, a titanate or a zirconate. More preferably, the adhesion promoter is an organofunctional alkoxysilane or halosilane with 1 or more organo silyl groups per molecule. Reference is made to U.S. patent application Ser. No. 09/476,151, filed Dec. 30, 1999, the specification of which is incorporated herein by reference as though fully set forth in its entirety, for a more detailed explanation of the adhesion promoter.

More preferred compounds include by way of example but not by way of limitation methacryloxypropyltrimethoxysilane, mercaptopropyltrimethoxysilane, aminopropyltrimethoxysilane, acryloxypropyltrimethoxysilane, bis(trimethoxysilylethyl)benzene and bis(triethoxysilylethyl)benzene. Bis (trimethoxysilylethyl)benzene is commercially available from Gelest (Tellytown, Pa.) and United Chemical Technologies, Inc. (Bristol, Pa.). Bis(triethoxysilylethyl) benzene can be synthesized from bis(trimethoxysilylethyl) benzene by trans-esterification with ethanol.

Preferably the adhesion promoter is present in an amount between about 0.1 to about 10 parts per hundred, more preferably between about 0.2 to about 5 parts per hundred, most preferably between about 0.5 to about 3 parts per hundred.

The primary coating composition preferably may also include a catalyst. Generally, however, the catalyst remains as an additive when forming the oligomer component or optionally additional quantities of the catalyst are introduced into the primary coating composition. In forming the oligomer conventional catalysts may be used including but not limited to tertiary amine catalysts, tin catalysts, lead and mercury catalysts and the like.

The primary coating composition preferably may also include an anti-oxidant. Most preferably, the anti-oxidant is thiodiethylene bis(3,5-di-tert-butyl-4-hydroxyhydrocinnamate) (e.g., Irganox 1035, available from Ciba Specialty Chemical). Preferably the anti-oxidant is present in an amount between about 0.1 to about 5 parts per hundred, more preferably between about 0.2 to about 2 parts per hundred, most preferably between about 0.5 to about 1.5 parts per hundred by weight.

The primary coating composition preferably may also include an adhesion promoter that includes a compound containing a reactive silane and a carrier. The carrier is preferably a carrier which functions as a carrier surfactant or ambiphilic reactive or non-reactive surfactant. Reactive surfactants which are partially soluble or insoluble in the composition are particularly preferred. Without being bound to a particular theory, it is believed that carriers which function as reactive surfactants interact with the compound containing a reactive silane by depositing such compounds on the glass fiber, where it is allowed to react. It is desirable for the carrier to be present in an amount between about 0.1 to about 5 parts per hundred, more preferably about 0.1 to about 2 parts per hundred by weight.

Suitable carriers, more specifically carriers which function as reactive surfactants, include polyalkoxypolysiloxanes. A preferred carrier is available from Goldschmidt Chemical Co. (Hopewell, Va.) under the tradename Tegorad 2200, and reactive surfactant Tegorad 2700 (acrylated siloxane) also from Goldschmidt Chemical Co.

Other classes of suitable carriers are polyols and non-reactive surfactants. Examples of suitable polyols and non-reactive surfactants include polyol Acclaim 3201 (poly(ethylene oxide-co-propylene oxide)) available from Bayer (formerly known as Lyondel), Newtown Square, Pa., and non-reactive surfactants Tegoglide 435 (polyalkoxy-polysiloxane) available from Goldschmidt Chemical Co. The polyol or nonreactive surfactants may be present in a preferred amount between about 0.01 pph to about 10 pph. Suitable carriers may also be ambiphilic molecules. An ambiphilic molecule is a molecule that has both hydrophilic and hydrophobic segments. The hydrophobic segment may alternatively be described as a lipophilic (fat/oil loving) segment.

A tackifier is also an example of a suitable carrier. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive commonly used in the adhesives industry, that enhances the ability of a coating to create a bond with an object that the coating is applied upon. For additional background regarding tackifiers and tackifier resins, the *Handbook of Pressure Sensitive Adhesive Technology*, 3rd Edition, (Warwick, R.I.) (1999) is incorporated herein by reference, see pages 36, 37, 57–61, 169, 173, 174, and 609–631.

Preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

A more preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 parts per hundred, more preferred in the amount between about 0.05 to about 10 parts per hundred by weight. A suitable alternative tackifier is the Escorez series of hydrocarbon tackifiers available from Exxon. For additional information regarding Escorez tackifiers, the specification of U.S. Pat. No. 5,643,665 is hereby incorporated by reference in its entirety. The aforementioned carriers may also be used in combination.

Secondary Coating

Preferably a secondary coating is used in the present invention. Secondary coating compositions are well known, and it is envisioned that the present invention may include those known secondary coating compositions. Preferably, however, the secondary coating used for the present invention has a high Young's modulus to resist external lateral forces, a low coefficient of friction, excellent resistance to environmental factors, a low water absorption and a low hydrogen generation. The secondary coating material is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, the specifications of which are hereby incorporated by reference. Various additives that enhance one or more properties of the coating can also be present, including the above-mentioned additives incorporated in the compositions of the present invention.

Typical secondary coatings will include at least one curable monomer and at least one photoinitiator. The secondary coating may also include about 0–90 weight percent of at least one curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably poly-functional (i.e., each containing two or more functional groups), although mono-functional monomers can also be introduced into the composition. Therefore, the ethylenically unsaturated monomer can be a poly-functional monomer, a mono-functional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for poly-functional monomers).

In general, individual monomers capable of about 60% or more conversion (i.e., when cured) are preferable to those having lower conversion rates, and individual monomers capable of about 80% or more conversion are more preferable to those having lower conversion rates. The degree to which monomers having lower conversion rates can be introduced into the composition depends upon the particular requirements (i.e., strength) of the resulting cured product. Typically, higher conversion rates will yield stronger cured products.

Examples of suitable poly-functional ethylenically unsaturated monomers are described earlier in the application as examples of monomers that can be added to the primary coating composition. Those same monomers can be used albeit in differing amounts to achieve the properties required for the secondary coating composition.

It may also be desirable to use certain amounts of mono-functional ethylenically unsaturated monomers, which can be introduced to influence the degree to which the cured product absorbs water, adheres to other coating materials, or behaves under stress. Examples of suitable mono-functional ethylenically unsaturated monomers are described earlier in the application as examples of monomers that can be added to the primary coating composition. Those same monomers can be used albeit in differing amounts to achieve the properties required for the secondary coating composition.

As indicated above, an optional constituent of the secondary coating composition is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers Di-functional oligomers preferably have a structure according to formula (I) below:

$$F_1-R_1-[\text{Diisocyanate-}R_2\text{-Diisocyanate}]_m-R_1-F_1 \quad (I)$$

where $F_1$ is independently a reactive functional group such as acrylate, methacrylate, acrylamide, N-vinyl amide, styrene, vinyl ether, vinyl ester, or other functional group known in the art; $R_1$ includes independently —$C_{2-12}O$—, —($C_{2-4}$—O)$_n$—, —$C_{2-12}$—O—($C_{2-4}$—O)$_n$—, or —$C_{2-12}$O—(CO—$C_{2-5}$NH)$_n$— where n is a whole number from 1 to 30, preferably 1 to 10; $R_2$ is polyether, polyester, polycarbonate, polyamide, polyurethane, polyurea, or combinations thereof and m is a whole number from 1 to 10, preferably 1 to 5. In the structure of formula I, the diisocyanate group is the reaction product formed following bonding of a diisocyanate to $R_2$ and/or $R_1$.

Other poly-functional oligomers preferably have a structure according to formula (II) or formula (III) as set forth below:

$$\text{multiisocyanate-}(R_2-R_1-F_2)_x \quad (II)$$

or $$\text{polyol-}[(\text{diisocyanate-}R_2\text{-diisocyanate})_m\text{-}R_1-F_2]_x \quad (III)$$

where $F_2$ independently represents from 1 to 3 functional groups such as acrylate, methacrylate, acrylamide, N-vinyl amide, styrene, vinyl ether, vinyl ester, or other functional groups known in the art; R1 can include —$C_{2-12}O$—, —($C_{2-4}$—O)$_n$—, —$C_{1-12}$—O—($C_{2-4}$—O)$_n$—, —$C_{2-12}O$—(CO—$C_{2-5}$O)$_n$—, or —$C_{2-12}O$—(CO—$C_{2-5}$NH)$_n$— where n is a whole number from 1 to 10, preferably 1 to 5; $R_2$ can be a polyether, polyester, polycarbonate, polyamide, polyurethane, polyurea, or combinations thereof; x is a whole number from 1 to 10, and preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., the specifications of which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

Polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently nonpolar and saturated as to avoid compromising the moisture resistance of the system.

Suitable oligomers include BR301, an aromatic urethane acrylate oligomer available from Bomar Specialty Co., Photomer 6010, an aliphatic urethane acrylate oligomer available from Cognis Corp., KWS5021, an aliphatic urethane acrylate oligomer available from Bomar Specialty Co., RCC12-892, a multi-functional aliphatic urethane acrylate oligomer available from Cognis Corp., RCC13-572, an aromatic urethane diacrylate oligomer available from Cognis Corp., and KWS4131, an aliphatic urethane acrylate oligomer available from Bomar Specialty Co.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 μm is, e.g., less than about 1.0 J/cm$^2$, preferably less than about 0.5 J/cm$^2$. It is preferred that the secondary coating composition contains about 10–90% of the monomer; of about 0–90% of the oligomer; and about 0.5–10% of the photoinitiator.

Suitable photoinitiators include, without limitation, 1-hydroxycyclohexylphenyl ketone (e.g., Irgacure 184 available from Ciba Specialty Chemical (Tarrytown, N.Y.)), bis(2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropan-4-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include by way of example, but not limitation, anti-oxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation). A preferred anti-oxidant is thiodiethylene bis(3,5-di-tert-butyl-4-hydroxyhydrocinnamate) (e.g., Irganox 1035, available from Ciba Specialty Chemical). Other suitable materials for use in secondary coating materials, as well as considerations related to selection of these materials are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention. Reference is made to U.S. Patent Application No. 60/173,874, filed Dec. 30, 1999, and Provisional U.S. Patent Application filed Jul. 26, 2000 by Botelho et al., titled Secondary Coating Compositions for Optical Fibers, the specifications of which are incorporated herein by reference as though fully set forth in its entirety, for a more detailed explanation of secondary coatings. Preferably, the cured secondary coating has a Young's modulus of at least about 50 MPa, more preferably at least about 600 MPa, even more preferably at least about 1000, and most preferably at least about 1200 MPa.

The cured secondary coating can be a tight buffer coating or, alternatively, a loose tube coating. Irrespective of the type of secondary coating employed, it is preferred that the outer surface of secondary coating not be tacky so that adjacent convolutions of the optic fiber (i.e., on a process spool) can be unwound.

EXAMPLES

The present invention will be further clarified by the following examples, which are intended to be exemplary of the invention.

Example 1
Preparation of the Oligomer for the Primary Coating

A mixture of 15.0 grams (0.057 mole) of 4,4'-methylenebis(cyclohexylisocyanate) (sold under the Bayer tradename Desmoder W), 290 milligrams of butylated hydroxytoluene (BHT) anti-oxidant and 290 milligrams of di-n-butyltin dilaurate was placed in a 500 milliliter resin kettle and stirred under a nitrogen atmosphere. The contents of the kettle were cooled to an internal temperature of 10–15° C. Once the kettle reached the aforementioned temperature range, 6.64 grams (0.057 moles) of 2-hydroxyethyl acrylate was added dropwise over a 15 minute period. The kettle was then heated to an internal temperature of around 80° C. over a period of 1 hour, and then re-cooled to around 45–50° C. At that time, 171.53 grams (0.029 moles) of tri-functional poly(propylene oxide) based polyol (sold under the Bayer tradename Acclaim 6320 with a hydroxyl number=27.6 milligrams/gram, 3 hydroxyl groups per chain and a molecular weight of approximately 6000) was added drop wise over a period of 2.5 hours. After the addition of the polyol was complete, the internal temperature of the kettle was raised to around 80° C., and held constant at this temperature over a period of 1.5 hours to complete the reaction.

Example 2
Preparation of the Primary Coating (to Produce Film for Mechanical Testing)

A mixture of 52.28 grams (52 weight % of the bulk coating) of the acrylated urethane oligomer from Example 1 and 44.95 grams (45 weight % of the bulk coating) of ethoxylated (4) nonylphenol acrylate monomer (sold by Cognis Corporation under the trade name of Photomer 4003) was placed into a jacketed beaker. The beaker was then attached to a heated circulating water bath and the temperature was set at 60° C. The oligomer and monomer were then mixed using a jiffy blade at a speed of about 225 rpm until the mixture reached a temperature of 60° C. 3.11 grams (3 weight percent of the bulk coating) of (2,6-dimethoxybenzoyl)-2,4,4-trimethylpentyl phosphine oxide blend with 1-hydroxy-cyclohexylphenyl ketone photoinitiator (sold by Ciba Specialty Chemical under the tradename Irgacure 1850), and 1.04 grams of thiodiethylene bis(3,5-di-tert-butyl-4-hydroxyhydrocinnamate) anti-oxidant (sold by Ciba Specialty Chemical under the tradename of Irganox 1035) were added to the mixture at this point. The beaker was then covered using aluminum foil to prevent the premature curing of the coating. This mixture was mixed for a total of 45 minutes at 60° C. The coating composition was removed and placed into a tared black container and allowed to cool for approximately 50 minutes. At this point, a mixture of a reactive surfactant carrier and an adhesion promoter was added to the coating mixture and mixed for 25 minutes. This mixture of carrier and promoter consisted of 0.5 grams (0.5 parts per hundred) of polyalkoxypolysiloxane (sold by Goldschmidt Chemical Company under the trade name Tegorad 2200) and 1.85 grams (2 parts per hundred) of bis(tri-methoxysilylethyl)benzene (sold by Gelest of Tellytown, Pa.) and was pre-mixed for 30 minutes. Wet films were cast from the coating composition on a silicone release paper with the aid of a draw-down box having a 5 mil gap thickness. Films were cured using a Fusion Systems UV curing apparatus with a 600 watt/in D-bulb (50% power, 10 ft/min belt speed, nitrogen purge). Cured film thickness was between 3 and 4 mil. The films were allowed to age (23 deg.C., 50% rh) for at least 16 hours prior to testing. Film samples were cut to a specified length and width (15 cm×1.3 cm) for mechanical testing according to ASTM Standard D882-97.

Example 3
Preparation of the Control Primary Coating (to Produce Film Samples)

A mixture of 5200 grams (52 weight % of the bulk coating) of a aliphatic urethane acrylate (sold by Bomar Specialty Company under the trade name of BR3731) and 4500 grams (45 weight % of the bulk coating) of ethoxylated (4) nonylphenol acrylate monomer (sold by Cognis Corporation under the trade name of Photomer 4003) was placed into a jacketed beaker. The beaker was then attached to a heated circulating water bath and the temperature was set at 60° C. The oligomer and monomer were then mixed using a jiffy blade at a speed of about 225 rpm until the mixture reached a temperature of 60° C. 309.24 grams (3 weight percent of the bulk coating) of (2,6-dimethoxybenzoyl)-2, 4,4-trimethylpentyl phosphine oxide blend with 1-hydroxy-cyclohexyl-phenyl ketone photoinitiator (sold by Ciba Specialty Chemical under the tradename Irgacure 1850), and 100.09 grams of thiodiethylene bis(3,5-di-tert-butyl-4-hydroxyhydrocinnamate) anti-oxidant (sold by Ciba Specialty Chemical under the tradename of Irganox 1035) were added to the mixture at this point. The beaker was then covered using aluminum foil to prevent the premature curing of the coating. This mixture was mixed for a total of 45 minutes at 60° C. The coating composition was removed and placed into a tared black container and allowed to cool for approximately 50 minutes. At this point, a mixture of a reactive surfactant carrier and an adhesion promoter was added to the coating mixture and mixed for 25 minutes. This mixture of carrier and the adhesion promoter consisted of 50.05 grams (0.5 parts per hundred) of polyalkoxypolysiloxane (sold by Goldschmidt Chemical Company under the trade name Tegorad 2200) and 200.18 grams (2 parts per hundred) of bis(tri-methoxysilylethyl)benzene (sold by Gelest of Tellytown, Pa.) and was pre-mixed for 30 minutes. Wet films were cast from the coating composition on a silicone release paper with the aid of a draw-down box having a 5 mil gap thickness. Films were cured using a Fusion Systems UV curing apparatus with a 600 watt/in D-bulb (50% power, 10 ft/min belt speed, nitrogen purge). Cured film thickness was between 3 and 4 mil. The films were allowed to age (23 deg.C., 50% rh) for at least 16 hours prior to testing. Film samples were cut to a specified length and width (15 cm×1.3 cm) for mechanical testing according to ASTM Standard D882-97.

Example 4

Mechanical Testing and $T_g$ Measurement of the Film

The films in Examples 2 and 3 were prepared for measurement of tensile strength, elongation at break and Young's modulus. In testing both the strength and the modulus, procedures set forth in ASTM Standard D882-97 (which is hereby incorporated by reference) were followed. Young's modulus, tensile strength at break, and elongation at break were measured using a MTS Sintech tensile tester (from MTS Systems of Eden Praire, Minn.). Films were tested at an elongation rate of 2.5 cm/min starting from an initial jaw separation of 5.1 cm.

The films were also tested to determine the glass transition temperature of the primary coating composition and the control. The glass transition temperatures of the cured films were determined from the tan delta curves measured on a Seiko-5600 DMS in tension at a frequency of 1 Hz. The results of both the mechanical testing and glass transition temperature of the primary coating composition and the control are listed in Table I.

The results as shown in Table I show a considerable improvement in the glass transition temperature ($T_g$) and the mechanical properties with the primary coating composition of the present invention.

TABLE I

| Coating Composition | Young's Modulus (MPa) | Tensile Strength (MPa) | Elongation At Break (%) | Glass Transition Temperature ($T_g$) (° C.) |
|---|---|---|---|---|
| Example 3-Control | 1.28 | 0.80 | 107 | −36.6 |
| Example 2 | 0.85 | 0.71 | 128 | −41.5 |

Example 5
Preparation of the Primary Coating (for Coating of Optical Fibers)

A second larger batch of primary coating was produced for the coating of optical fibers. The oligomer for this batch of coating was produced by using the procedure outlined in Example 1, in multiple batches, on a scale that provided around 1200 grams per batch. A mixture of 2029.77 grams (52 weight % of the bulk coating) of the acrylated urethane oligomer from Example 1 and 1756.53 grams (45 weight % of the bulk coating) of ethoxylated (4) nonylphenol acrylate monomer (sold by Cognis Corporation under the trade name of Photomer 4003) was placed into 4 liter glass vessel. The vessel was placed in a heating mantle controlled by a variable power supply. The contents were mixed for a period of one hour until the temperature of the mixture reached 55° C. The impeller speed was set at about 225 rpm, and after 118.24 grams (3 weight percent of the bulk coating) of (2,6-dimethoxybenzoyl)-2,4,4-trimethylpentyl phosphine oxide blended with 1-hydroxycyclohexyl phenyl ketone photoinitiator (sold by Ciba Specialty Chemical under the trade name Irgacure 1850), and 39.18 grams of thiodiethylene bis(3,5-di-tert-butyl-4-hydroxyhydrocinnamate) antioxidant (sold by Ciba Specialty Chemical under the trade name of Irganox 1035) were added to the mixture, the vessel was covered with aluminum foil and mixed for a period of an additional 50 minutes. The coating composition was removed and placed into a 1 gallon container and allowed to cool overnight to room temperature. At that point, a mixture of a reactive surfactant carrier and an adhesion promoter was added to the coating mixture and mixed for 1 hour at room temperature. This mixture of carrier and the adhesion promoter consisted of 20.38 grams (0.5 parts per hundred) of polyalkoxypolysiloxane (sold by Goldschmidt Chemical Company under the trade name Tegorad 2200) and 80.11 grams (2 parts per hundred) of bis(tri-methoxysilylethyl) benzene (sold by Gelest of Tellytown, Pa.) and was pre-mixed for 30 minutes before adding to the coating mixture.

Example 6
Preparation of Secondary Coating

A mixture of 10 weight % of an aliphatic urethane acrylate oligomer (produced under the tradename KWS4131 and sold by Bomar Specialty Company), 5 weight % of epoxy acrylate (produced under the tradename Photomer 3016 and sold by Cognis Corporation of Ambler, Pa.), and 82 weight % of difunctional monomer (produced under the tradename Photomer 4028 and sold by Cognis Corporation of Ambler, Pa.) was introduced into a heated kettle and blended at 60° C. for about 1 hour. To the blended mixture 1.5 weight % bis(2,4,6-trimethyl benzoyl)phenyl-phosphine oxide photoinitiator (produced under the tradename Irgacure 819 and sold by Ciba Specialty Chemicals of Tarrytown, N.Y.), 1.5 weight % 1-hydroxycyclohexyl phenyl ketone photoinitiator (produced under the tradename Irgacure 184 and sold by Ciba Specialty Chemicals of Tarrytown, N.Y.) and 0.5 parts per hundred of thiodiethylene bis(3,5-di-tert-butyl-4-hydroxyhydrocinnamate) antioxidant (produced under the tradename Irganox 1035 and sold by Ciba Specialty Chemical of Tarrytown, N.Y.) were added. The additional components were blended until thoroughly mixed.

Example 7
Preparation of Optical Fibers

Using the coating compositions prepared as described in Example 5 (the primary coating) and Example 6 (the secondary coating for both the control and the primary coating of the invention), primary and secondary coating materials were applied to drawn glass fibers subsequent to cooling. A DSM Desotech (Elgin, Ill.) primary coating was used as a control primary coating. The glass fiber coated with the above coatings was a single mode fiber. One example of such a fiber is SMF-28™ available from Corning Incorporated, Corning, N.Y. The glass fiber, having a diameter of about 125 μm, was introduced into a chamber containing the primary coating composition or the control primary coating composition. As the coated fiber was removed from the chamber, the thickness of the primary coating composition was adjusted so that the cured coating thickness would be about 190 μm. The coating thickness was adjusted by passing the coated fiber through a die. The primary coating composition was then cured with ultraviolet radiation at a dose level of at least about 0.5 J/cm² using a D bulb (available from Fusion UV Systems, Inc.). The coated fiber was drawn through a second coating chamber containing secondary coating composition from Example 6. As the coated fiber was removed from the second chamber, the thickness of the secondary coating composition was adjusted so that the cured coating thickness would be about 245 μm. The secondary coating thickness was also adjusted by passing the coated fiber through a die. The secondary coating composition was then cured with ultraviolet radiation at a dose level of at least about 0.5 J/cm² using a D bulb. The coated optical fibers were then aged for at least about 14 days.

For purposes of clarity, fibers coated with an example of the primary coating composition of the invention are referred to as Example 5 and fibers coated with the control primary coating composition are referred to as Primary Control. Both types of coatings then used the secondary coating composition described in Example 6.

Example 8
Micro-bend Sensitivity

The coated fibers produced in Example 7 were tested for micro-bend sensitivity. Two tests were performed on the fibers. The first was the Expandable Drum Micro-bend Test ("EDM"), and the second was the Lateral Load Wire Mesh Test ("LLWM").

The EDM test is performed as follows. The test measures the slope of attenuation loss due to strain at different wavelengths of light. To perform the test, a length of fiber 750 m long is tension at 70 grams of tension in a single layer, with no crossovers on an expandable drum. The expandable drum surface is made from High Impact Polystyrene to prevent damage to the fiber and should be free of scratches and contaminates that could cause premature microbending to occur. The expandable drum is a drum with a unexpanded diameter of 30 cm (55 cm in length) that can be expanded uniformly to apply strain to the fiber wound on the drum. Each time the drum diameter was increased the diameter was increased about 2 mm or less. The diameter of the drum was expanded four times during the testing procedure.

The drum includes a mechanism that will allow a user to controllably apply a strain to the fiber on the drum by increasing the diameter of the drum having fiber wound onto the drum. The increase in diameter of the drum is controlled by the movement of an expansion element. To expand the diameter of the drum, the expansion element is turned 90° in a clockwise direction. Each time the expansion element is turned 90° the drum diameter is expanded. As the drum expands, an elongation force is applied to the fiber. An example of the elongation force applied to a sample of SMF-28™ fiber, in terms of percent strain, is listed in table II.

TABLE II

| Degree of Turn of Expansion Element | % Strain (Sample size was 15) |
| --- | --- |
| 90° | ≧0.053 |
| 180° | 0.138 |
| 270° | 0.212 |
| 360° | ≦0.296 |

The data point for 90° is the minimum percent strain for any one sample. Likewise, the data point for 360° is the maximum data point. The data points for 180° and 270° are the respective averages for each point.

The attenuation loss of the fiber is measured at wavelengths of 1310, 1550 and 1625 nm as initially wound on the drum and at the four strain increments of the expandable drum using a Photon Kinetics Model 2500 spectral attenuation bench-optical fiber analysis system (manufactured by Photon Kinetics of Beaverton, Oreg.). The user's manual for the model is herein incorporated by reference. The use of Model 2500 to perform the attenuation measurement is explained therein. The five measurements taken at each light wavelength of 1310, 1550 and 1625 nm are then plotted to determine the slope of attenuation loss due to strain.

The results as shown in Table III show a considerable improvement in attenuation loss using the primary coating composition of the present invention over a control coating composition.

TABLE III

| | Slope Loss Due to Strain (dB/km)/% Strain | | |
| --- | --- | --- | --- |
| Coating | 1310 nm | 1550 nm | 1625 nm |
| Primary-Control | 0.803 | 2.136 | 4.340 |
| Example 5 | 0.151 | 0.446 | 0.891 |

The LLWM test is performed as follows. This test measures the spectral power of light launched through a fiber as a lateral load is applied to the fiber. Lateral load is a force normal to a cross section of the fiber. Each sample was tested 5 times.

A length of fiber is extended from a light source (a.k.a. launch stage) to a detector stage. A preferred detector stage is a Photon Kinetics (hereinafter "PK") spectral attenuation measurement bench. A suitable device is Model 2500, optical fiber analysis system, from Photon Kinetics of Beaverton, Oreg. The user's manual for the model is herein incorporated by reference. The use of Model 2500 to perform the attenuation measurement is explained therein. The length of fiber must be sufficient to extend from the light source to the measurement bench. The length of fiber also should include a loose predetermined configuration of fiber disposed on an Instron® mechanical stress/strain measurement device as described below.

An Instron® mechanical measuring device is used to apply a lateral load on the fiber. The Instron® mechanical measuring device is a device capable of controllably applying a load on a material. The force of the load can be controlled and measured along with the rate of loading as a function of time. Further, the deformation imposed on the test sample of material (the piece of fiber) during the course of the loading event can be measured as well. For these tests an Instron® Model No. 4502 was used. This device was manufactured by Instron Corporation of Canton, Mass. Similar devices are available from other manufacturers.

The Instron® Model 4502 has a lower steel plate and an upper steel plate. The plates are oriented such that the force imposed by the upper plate on the lower plate is normal to the lower plate. The sample of fiber to be tested is placed on a rubber pad attached to the lower plate. The rubber pad has a shore A Hardness of 70+/−5. It is essential to ensure that the rubber pad is flat and not marked by grooves of any sort. If necessary, the pad should be replaced or cleaned with isopropyl alcohol.

The fiber is looped approximately 340 degrees around a mandrel having a diameter of 98.5 mm. The fiber may be held in place on a rubber pad by no more than three pieces of thin tape with a maximum width of 3 mm each. A portion of the tape is cut away to prevent fiber crossover at the point where the fiber ends exit the Instron® mechanical testing device.

The mandrel is removed and a number 70 wire mesh is placed on top of the fiber loop on the rubber pad, sandwiching the fiber between the rubber pad and the wire mesh. An initial attenuation of the fiber is recorded at 1310 nm, 1550 nm and 1625 nm. A compressive lateral load is applied to the fiber in increments of 10 N. The total lateral load applied is increased up to 70 N. The induced attenuation is recorded for each incremental increase in lateral load. The average change in attenuation is calculated for each incremental load between 30 N and 70 N. The test may also be used to record the change in attenuation in terms of change in decibels (Δ dB) at each of the three aforementioned wavelengths. The change in attenuation is measured in accordance with the cut back method.

The cutback method calculates the optical loss characteristics of a fiber by measuring the power received on the output side of the fiber at various lengths. The method includes launching an optical signal, of a relative strength, through a first end of the test fiber by the use of an optical source. A portion of the launched optical signal may travel in the cladding. The signal is detected at the end of the fiber and the power of the signal at the second end is measured. The signal is detected by use of an optical detector. The detector accounts for all of the light at the second end of the fiber, irrespective if the light was propagated in the core or the cladding.

The length of the fiber must be such that a detectable amount of signal is present at the second end of the fiber. This length of fiber is known as $L_1$. The fiber is cut to a length $L_2$, which is less than $L_1$. Once again an optical signal is transmitted through the fiber and the signal strength is detected at the second end of the fiber. The optical loss is determined based on the difference in signal strength for measurements at lengths $L_1$ and $L_2$. The optical loss is 10 $\log_{10}$ (Power ($L_2$)/Power ($L_1$)). The attenuation is determined by dividing the optical loss by the difference in length between $L_1$ and $L_2$. The change in attenuation is measured as the load is applied in the same manner as the induced attenuation is measured.

Again, the results as shown in Table IV show a considerable improvement in attenuation loss using the primary coating composition of the present invention in comparison to a control coating composition.

TABLE IV

| Coating | 1310 nm | | 1550 nm | | 1625 nm | |
|---|---|---|---|---|---|---|
| | 30–70 N | Std. Dev. | 30–70 N | Std. Dev | 30–70 N | Std. Dev. |
| Primary-Control | 0.31 | 0.16 | 0.62 | 0.29 | 0.85 | 0.33 |
| Example 5 | 0.10 | 0.03 | 0.15 | 0.05 | 0.25 | 0.11 |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A coated optical fiber comprising:
   an optical fiber and a radiation cured coating, wherein the radiation cured coating on the optical fiber comprises an oligomer wherein the oligomer is formed from a reaction comprising a polyol having "m" hydroxyl functional groups, wherein "n" hydroxyl groups of said polyol are terminated in forming the oligomer and "m" is greater than "n".

2. The coated optical fiber in claim 1, wherein the radiation cured coating further comprises a second oligomer.

3. The coated optical fiber in claim 1, wherein "m"–"n"≧about 1.

4. The coated optical fiber in claim 3, wherein "m"≦4.

5. The coated optical fiber in claim 1, wherein a number average molecular weight of said oligomer is at least 6000 Daltons.

6. The coated optical fiber in claim, 1 wherein the oligomer is a (meth)acrylated urethane oligomer.

7. The coated optical fiber in claim 6, wherein the radiation cured coating has a $T_g$ of less than about −35° C.

8. The coated optical fiber in claim 6, wherein the radiation cured coating has a $T_g$ of less than about −40° C.

9. The coated optical fiber in claim 1, wherein the radiation cured coating has a $T_g$ of less than about −30° C.

10. The coated optical fiber in claim 1, wherein the radiation cured coating includes a monomer having a functional group or groups selected from the group consisting of acrylates, methacrylates, acrylamides, N-vinyl am ides, styrenes, vinyl ethers, vinyl esters, acid esters and combinations thereof.

11. The coated optical fiber in claim 10, wherein the monomer has a viscosity of less than about 500 centipoise and the monomer is an acrylate.

12. The coated optical fiber in claim 1, wherein the radiation cured coating has a Young's modulus of less than about 1.2 MPa.

13. The coated optical fiber in claim 1, wherein the radiation cured coating has a Young's modulus of less than about 1.0 MPa.

14. The coated optical fiber in claim 1, wherein the radiation cured coating has a Young's modulus of about 0.85 MPa or less.

15. The coated optical fiber in claim 1, wherein the radiation cured coating has an elongation at break of greater than about 100%.

16. The coated optical fiber in claim 15, wherein the coated optical fiber has a micro-bend attenuation as measured by the LLWM test of less than about 0.3 dB/m at a wavelength of 1310 nm, of less than about 0.35 dB/m at a wavelength of 1550 nm, and of less than about 0.55 dB/m at a wavelength of 1625 nm.

17. The coated optical fiber in claim 16, wherein the coated optical fiber has a micro-bend attenuation as measured by the EDM test of less than about 0.35 (dB/km)/% strain at a wavelength of 1310 nm, of less than about 1.1 (dB/km)/% strain at a wavelength of 1550 nm, and of less than about 2.0 (dB/km)/% strain at a wavelength of 1625 nm.

18. The coated optical fiber in claim 1, wherein the coated optical fiber has a micro-bend attenuation as measured by the LLWM test of less than about 0.1 dB/m at a wavelength of 1310 nm, of less than about 0.15 dB/m at a wavelength of 1550 nm, and of less than about 0.25 dB/m at a wavelength of 1625 nm.

19. The coated optical fiber in claim 18, wherein the coated optical fiber has a micro-bend attenuation as measured by the EDM test of less than about 0.151 (dB/km)/% strain at a wavelength of 1310 nm, of less than about 0.75 (dB/km)/% strain at a wavelength of 1550 nm, and of less than about 1.4 (dB/km)/% strain at a wavelength of 1625 nm.

20. The coated optical fiber in claim 1, wherein the optical fiber has an effective area greater than about 70 $\mu m^2$, said effective area measured at a wavelength of 1550 nm, and the coated optical fiber has a micro-bend attenuation as measured by the LLWM test of less than about 0.1 dB/m at a wavelength of 1310 nm, of less than about 0.3 dB/m at a wavelength of 1550 nm, and of less than about 1.0 dB/m at a wavelength of 1625 nm.

21. The coated optical fiber in claim 20, wherein the optical fiber has an effective area greater than about 70 $\mu m^2$, said effective area measured at a wavelength of 1550 nm, and the coated optical fiber has a micro-bend attenuation as measured by the EDM test of less than about 0.151 (dB/km)/% strain at a wavelength of 1310 nm, of less than about 2.0 (dB/km)/% strain at a wavelength of 1550 nm, and of less than about 4.0 (dB/km)/% strain at a wavelength of 1625 nm.

22. A coated optical fiber comprising:
an optical fiber, a radiation cured primary coating and a radiation cured secondary coating, wherein the radiation cured primary coating comprises an oligomer wherein the oligomer is formed from a reaction comprising a polyol having "m" hydroxyl functional groups, wherein "n" hydroxyl groups of said polyol are terminated in forming the oligomer and "m" is greater than "n", and has a $T_g$ of less than about −30° C., a Young's modulus of less than about 1.0 MPa, a tensile strength of at least 50% of the modulus and an elongation to break of at least about 100%.

23. The coated optical fiber in claim 22, wherein the radiation cured primary coating has a $T_g$ of less than about −40° C., a Young's modulus of less than about 1.0 MPa, a tensile strength of at least 50% of the modulus and an elongation to break of at least about 100%.

24. The coated optical fiber in claim 22, wherein the radiation cured primary coating comprises an oligomer wherein a number average molecular weight of said oligomer is at least 6000 Daltons.

25. The coated optical fiber in claim 22, wherein the radiation cured secondary coating has a Young's modulus greater than the Young's modulus of the radiation cured primary coating.

26. The coated optical fiber an claim 25, wherein the radiation cured secondary coating has a Young's modulus of greater than about 600 Mpa.

27. The coated optical fiber in claim 22, wherein "m"−"n"≧about 1 and "m"≦about 4.

28. A coated optical fiber comprising:
an optical fiber,
a radiation cured primary coating and
a radiation cured secondary coating
wherein the radiation cured primary coating is the cured product of a bulk composition comprising:
an acrylated urethane oligomer,
an ethylenically unsaturated monomer and
a photoinitiator;
wherein the oligomer is formed from a reaction comprising a polyol having "m" hydroxyl functional groups, wherein "n" hydroxyl groups of said polyol are terminated in forming the oligomer and "m" is greater than "n", and said polyol has a number average molecular weight of at least 4000 Daltons;
wherein the ethylenically unsaturated monomer has an number average molecular weight of less than about 1000 Daltons;
wherein the radiation cured primary coating has a Young's modulus of less than about 1.0 MPa, a $T_g$ of less than about −30° C., an elongation to break of at least about 100%, and a tensile strength of at least 50% of the Young's modulus; and
wherein the cured radiation curable secondary coating has a Young's modulus of greater than about 600 MPa.

29. The coated optical fiber in claim 28, wherein "m"−"n"≧about 1 and "m"≦about 4.

30. The coated optical fiber in claim 28, wherein the radiation cured coating further comprises a second oligomer.

31. The coated optical fiber in claim 28, wherein the ethylenically unsaturated monomer is selected from the group of a mono-functional monomer, a poly-functional monomer, and mixtures thereof.

32. The coated optical fiber in claim 28, wherein the ethylenically unsaturated monomer comprises a mono-functional monomer having a functional group selected from the group consisting of acrylates, methacrylates, acrylamides, N-vinyl amides, styrenes, vinyl ethers, vinyl esters, acid esters and combinations thereof.

33. The coated optical fiber in claim 28, wherein the monomer has a viscosity of less than about 500 centipoise and the monomer is an acrylate.

34. The coated optical fiber in claim 28, wherein the radiation cured primary coating has a $T_2$ of less than about −40° C.

35. The coated optical fiber in claim 28, wherein the acrylated urethane oligomer is present in an amount from about 40 to about 65 weight percent, the ethylenically unsaturated monomer is present in an amount from about 60 to about 20 weight percent, and the photoinitiator is present in an amount from about 0.1 to about 10 weight percent of a bulk radiation curable primary coating composition.

36. A coated optical fiber comprising:
an optical fiber,
a radiation cured primary coating comprising an oligomer, wherein the oligomer is formed from a reaction comprising a polyol having "m" hydroxyl functional groups, wherein "n" hydroxyl groups of said polyol are terminated in forming the oligomer and "m" is greater than "n" and
a radiation cured secondary coating wherein the coated optical fiber has a micro-bend attenuation as measured by the LLWM test of less than about 0.3 dB/m at a wavelength of 1310 nm, of less than about 0.35 dB/m at a wavelength of 1550 nm, and of less than about 0.55 dB/m at a wavelength of 1625 nm.

37. The coated optical fiber in claim 36, wherein the radiation cured primary coating is the cured product of a bulk composition comprising:
an acrylated urethane oligomer,
an ethylenically unsaturated monomer and
a photoinitiator.

38. The coated optical fiber in claim 37, wherein the oligomer has a number average molecular weight of at least 4000 Daltons.

39. The coated optical fiber in claim 37, wherein the ethylenically unsaturated monomer has an number average molecular weight of less than about 1000 Daltons.

40. The coated optical fiber in claim 37, wherein the radiation cured primary coating has a Young's modulus of less than about 1.0 MPa, and a T, of less than about −40° C.

41. The coated optical fiber in claim 37, wherein the cured radiation curable secondary coating has a Young's modulus of greater than about 600 MPa.

42. The coated optical fiber in claim 36, wherein the coated optical fiber has a micro-bend attenuation as measured by the LLWM test of less than about 0.1 dB/m at a wavelength of 1310 nm, of less than about 0.15 dB/m at a wavelength of 1550 nm, and of less than about 0.25 dB/m at a wavelength of 1625 nm.

43. The coated optical fiber in claim 42, wherein the coated optical fiber has a micro-bend attenuation as measured by the EDM test of less than about 0.151 (dB/km)/% strain at a wavelength of 1310 nm, of less than about 0.75 (dB/km)/% strain at a wavelength of 1550 nm, and of less than about 1.4 (dB/km)/% strain at a wavelength of 1625 nm.

44. The coated optical fiber in claim 36, wherein the optical fiber has an effective area greater than about 70 $\mu m^2$, said effective area measured at a wavelength of 1550 nm, and the coated optical fiber has a micro-bend attenuation as measured by the LLWM test of less than about 0.1 dB/m at a wavelength of 1310 nm, of less than about 0.3 dB/m at a wavelength of 1550 nm, and of less than about 1.0 dB/m at a wavelength of 1625 nm.

45. The coated opt claim 44, wherein optical fiber has an effective area greater than about 70 $\mu m^2$, said effective area measured at a wavelength of 1550 nm, and the coated optical fiber has a micro-bend attenuation as measured by the EDM test of less than about 0.151 (dB/km)/% strain at a wavelength of 1310 nm, of less than about 2.0 (dB/km)/% strain at a wavelength of 1550 nm, and of less than about 4.0 (dB/km)/% strain at a wavelength of 1625 nm.

46. A method of coating an optical fiber comprising the steps of:

(a) drawing an optical fiber comprising a core and a cladding;

(b) coating the optical fiber with a radiation curable coating comprising an oligomer, wherein the oligomer is formed from a reaction comprising a polyol having "m" hydroxyl functional groups, wherein "n" hydroxyl groups of said polyol are terminated in forming the oligomer and "m" is greater than "n"; and (c) irradiating the optical fiber at a dose level of from about 0.5 J/cm$^2$ to about 1.0 J/cm$^2$;

wherein the coated optical fiber has a micro-bend attenuation as measured by the LLWM test of less than about 0.3 dB/m at a wavelength of 1310 nm, of less than about 0.35 dB/m at a wavelength of 1550 nm, and of less than about 0.55 dB/m at a wavelength of 1625 nm.

47. The method in claim 46, wherein the radiation cured coating further comprises a second oligomer.

48. The method in claim 46, wherein "m"−"n"≧about 1.

49. The method in claim 46, wherein m≦about 4.

50. The method in claim 46, wherein the coated optical fiber has a micro-bend attenuation as measured by the LLWM test of less than about 0.1 dB/m at a wavelength of 1310 nm, of less than about 0.15 dB/m at a wavelength of 1550 nm, and of less than about 0.25 dB/m at a wavelength of 1625 nm.

51. The method in claim 50, wherein the coated optical fiber has a micro-bend attenuation as measured by the EDM test of less than about 0.151 (dB/km)/% strain at a wavelength of 1310 nm, of less than about 0.75 (dB/km)/% strain at a wavelength of 1550 nm, and of less than about 1.4 (dB/km)/% strain at a wavelength of 1625 nm.

52. The method in claim 46, wherein the optical fiber has an effective area greater than about 70 $\mu m^2$, said effective area measured at a wavelength of 1550 nm, and the coated optical fiber has a micro-bend attenuation as measured by the LLWM test of less than about 0.1 dB/m at a wavelength of 1310 nm, of less than about 0.3 dB/m at a wavelength of 1550 nm, and of less than about 1.0 dB/m at a wavelength of 1625 nm.

53. The method in claim 52, wherein the optical fiber has an effective area greater than about 70 $\mu m^2$, said effective area measured at a wavelength of 1550 nm, and the coated optical fiber has a micro-bend attenuation as measured by the EDM test of less than about 0.151 (dB/km)/% strain at a wavelength of 1310 nm, of less than about 2.0 (dB/km)/% strain at a wavelength of 1550 nm, and of less than about 4.0 (dB/km)/% strain at a wavelength of 1625 nm.

* * * * *

UNITED STATES PATENT AND TRADEMARK OFFICE
CERTIFICATE OF CORRECTION

PATENT NO. : 6,849,333 B2
DATED : February 1, 2005
INVENTOR(S) : Schissel, David N. et al.

It is certified that error appears in the above-identified patent and that said Letters Patent is hereby corrected as shown below:

Column 24,
Line 25, "acrylates, methacrylates, acrylamides, N-vinyl am ides," should be
-- acrylates, methacrylates, acrylamides, N-vinyl amides, --

Column 25,
Line 54, "26.  The coated optical fiber an claim 25, wherein the" should be
-- The coated optical fiber in claim 25, wherein the --

Column 26,
Line 36, "radiation cured primary coating has a $T_2$ of less than about" should be
-- radiation cured primary coating has a $T_g$ of less than about --

Column 27,
Line 6, "less than about 2.0 MPa, and a T, of less than about -40°C." should be
-- less than about 2.0 MPa, and a $T_g$, of less than about -40°C. --
Line 31, "45.  The coated op claim 44, wherein optical fiber has an" should be
-- 45.  The coated optical fiber in claim 44, wherein the optical fiber has an --

Signed and Sealed this

Twenty-sixth Day of April, 2005

JON W. DUDAS
*Director of the United States Patent and Trademark Office*